Nov. 15, 1960　　　　S. D. WILLIAMS　　　　2,960,146
PLASTIC PANELS AND APPARATUS AND PROCEDURE
FOR PRODUCING SAME
Filed Oct. 11, 1956　　　　　　　　　　　　　　6 Sheets-Sheet 1

INVENTOR.
Steele D. Williams
BY Green McCallister Miller
HIS ATTORNEYS

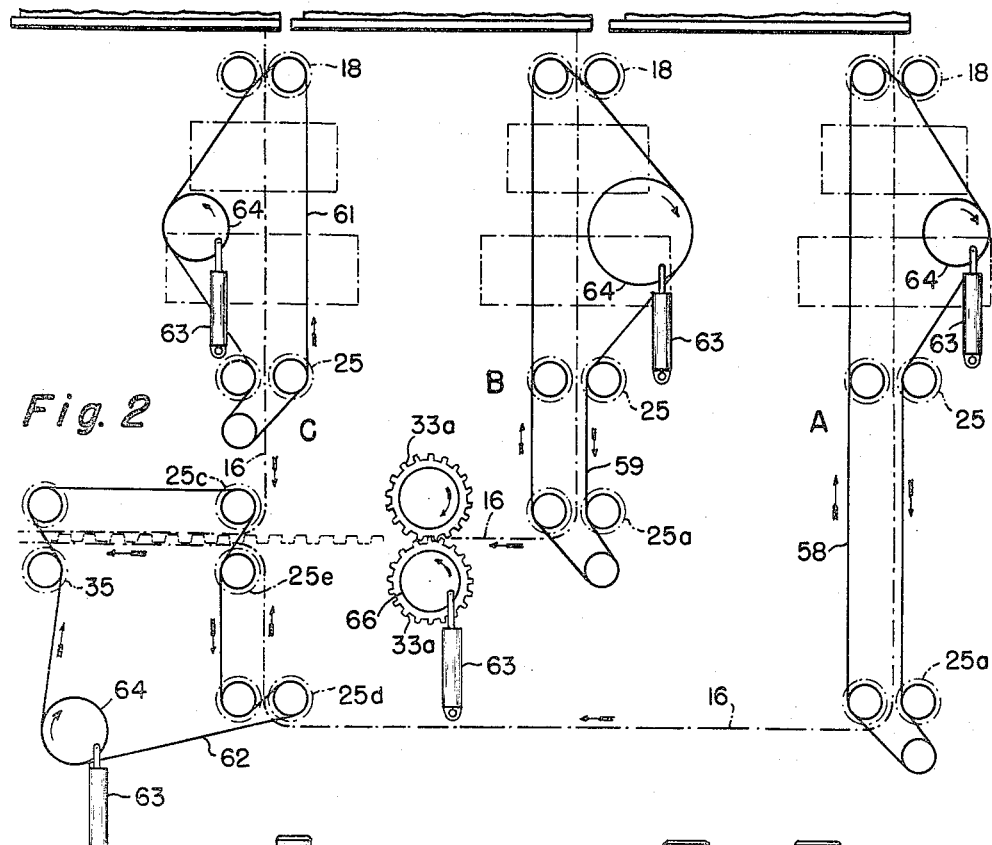
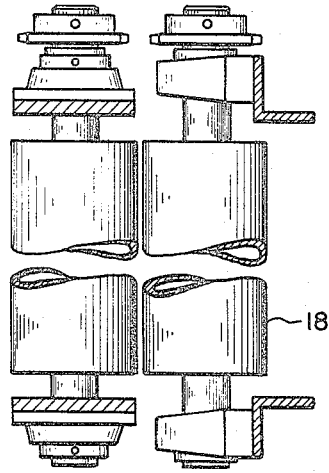
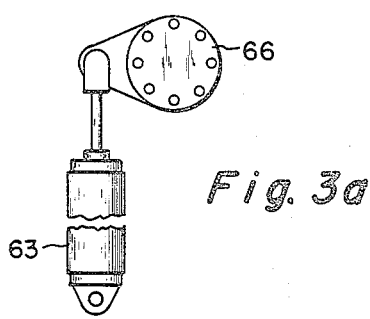

Nov. 15, 1960    S. D. WILLIAMS    2,960,146
PLASTIC PANELS AND APPARATUS AND PROCEDURE FOR PRODUCING SAME
Filed Oct. 11, 1956    6 Sheets-Sheet 3

INVENTOR.
Steele D. Williams
BY
HIS ATTORNEYS

INVENTOR.
Steele D. Williams

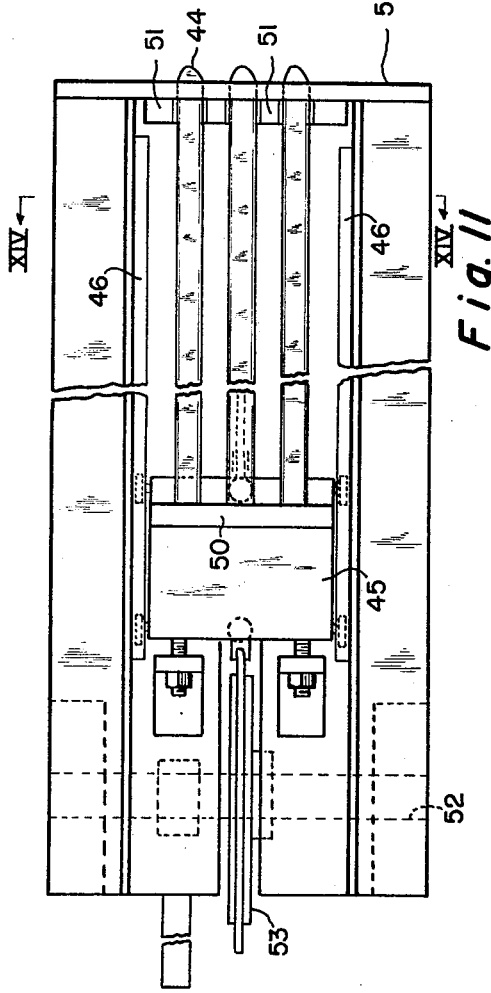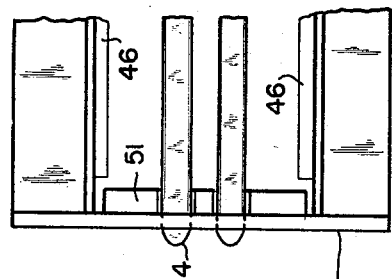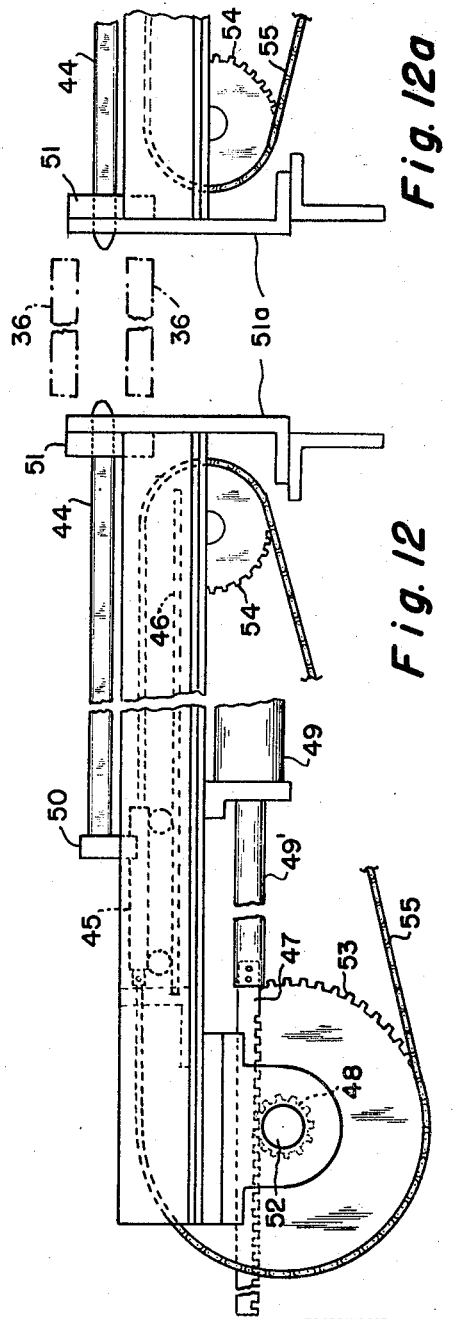

Nov. 15, 1960    S. D. WILLIAMS    2,960,146
PLASTIC PANELS AND APPARATUS AND PROCEDURE
FOR PRODUCING SAME
Filed Oct. 11, 1956    6 Sheets-Sheet 6

INVENTOR.
Steele D. Williams
BY *Green McCallister & Miller*
HIS ATTORNEYS

United States Patent Office 2,960,146
Patented Nov. 15, 1960

2,960,146

PLASTIC PANELS AND APPARATUS AND PROCEDURE FOR PRODUCING SAME

Steele D. Williams, Weston, W. Va.
(111 S. Palisades Drive, Signal Mountain, Tenn.)

Filed Oct. 11, 1956, Ser. No. 615,253

10 Claims. (Cl. 154—32)

This invention relates to panels formed from fiber reinforced plastic material.

An object of the invention is to produce sturdy, rigid panels capable of use for construction purposes such, for example, as part of trailer bodies, buildings and similar structures where light weight, strength, rigidity and durability are required.

A further object is to produce a panel structure made up of fiber glass mats inpregnated with catalyzed resin and which includes a corrugated strip permanently secured to one or two flat fiber glass reinforced sheets so as to form a panel having a flat sheet lying flat against, and secured to the tips of the corrugations on one or on both sides of the corrugated strip.

A further object is to produce apparatus and procedure for forming such panels of various dimensions and of various structural details.

A further object is to produce continuous procedure for manufacturing such panels.

A still further object is to produce apparatus for forming panels made up of two or more reinforced plastic strips rigidly secured together and in which one such strip may be corrugated and so secured to a flat strip as to form a rigid, integral structure.

A still further object of the invention is a plastic strip of panel material and method of producing same in which the panel strip is formed of two sheets of plastic material, one of which is corrugated and in which an uncorrugated strip is of equal width and registers with the corrugated strip and is permanently secured to the tips of the corrugations of such strip as, for example, by curing both strips.

These and other objects are attained by means of apparatus and procedure embodying features such as illustrated in the accompanying drawings.

Fig. 1 diagrammatically illustrates apparatus for continuously forming fiber reinforced panels in strip-like form and including a central portion of special form integrally sandwiched between and secured to flat strips of fiber reinforced plastic material.

Fig. 2 is a diagrammatic illustration of driving mechanisms which may be employed for propelling the strip-like material during the formation of the finished product and for actuating the forming and finishing mechanisms employed in the production of the finished product.

Fig. 3 is a fragmental plan view of pressure-applying and propelling rolls which constitute a part of the apparatus diagrammatically illustrated in Figures 1 and 2 and which are shown in connection with the propelling mechanism therefor.

Figure 3a is a fragmental view in elevation further illustrating a hydraulic cylinder and clutch mechanism of Figure 3.

Fig. 11 is a fragmental plan view of forming pins or mandrels and mandrel-operating mechanism forming a part of the apparatus constituting an embodiment of my invention. Fig. 11a is a fragmental plan view of mandrels which cooperate with the mandrels of Fig. 11.

Fig. 12 is a fragmental side elevation of the apparatus shown in Fig. 11.

Fig. 12a is a fragmental sectional view of the apparatus of Figure 11a.

Figure 1:
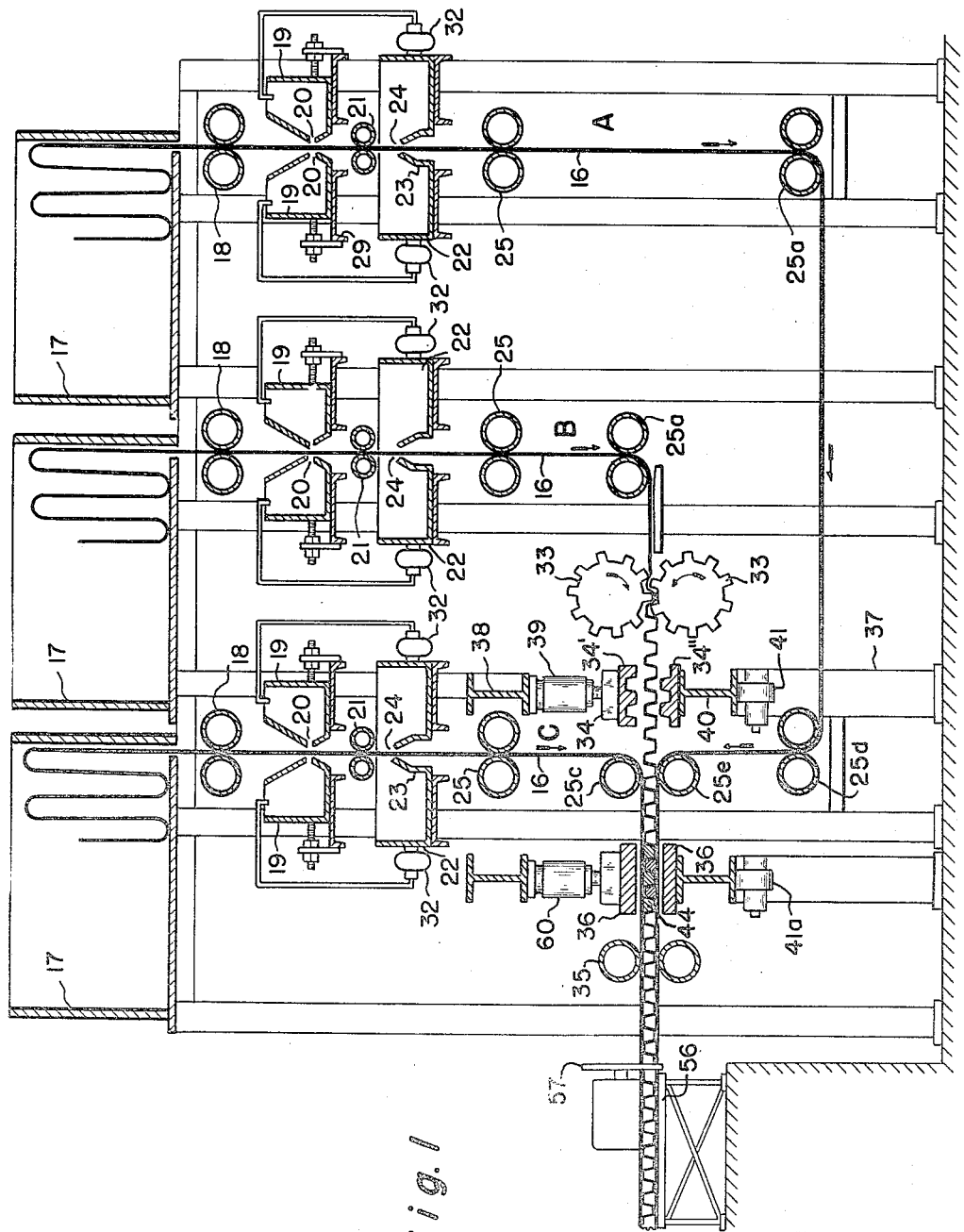

Procedure which forms one aspect of my invention consists in simultaneously moving each of two strips formed of fiber glass longitudinally of itself and separately impregnating each such strip with a liquid plastic material, corrugating one of such strips, moving the two strips into contact so that the uncorrugated strips lies against the tips of the corrugations of the corrugated strip and then securing the two strips together by applying a curing heat to the plastic impregnated strips while they are held in intimate contact with each other. My invention also involves procedure in which each of three flat strips of fiber glass material is moved longitudinally of itself and the three are then simultaneously and separately impregnated with liquid plastic material and in which one such strip is corrugated or otherwise specially formed and then moved into contact with, and between the other two strips so that the specially formed strip is located between the two flat strips and is then permanently secured to them by applying a curing heat to the impregnating plastic material which permeates the three strips.

A specific aspect of my invention involves at least two strips formed of plastic material, one of which is corrugated and in which an uncorrugated strip lies flat against the corrugations of the corrugated strip with the longitudinal edge portions of both strips in register and with the uncorrugated strip secured by a curing operation to the tips of the corrugations of the corrugated strip.

In carrying forward procedure embodying my invention I preferably employ apparatus which includes a plurality of units, each of which functions to impregnate a strip of interwoven fibrous material with a liquid plastic material, such, for example, as catalyzed resin. After impregnation, the impregnated strip is compressed and, as illustrated in the drawings, the compression is applied to each strip by a separate set of rotating rolls. In the illustrated embodiment, three units are disclosed and each strip is periodically moved longitudinally of itself in a forward direction. One such unit is equipped with apparatus for especially forming the strip after it has been impregnated. The specially formed strip is then moved to a position between two previously impregnated strips and pressure is applied to the three strips so as to hold them in intimate contact with each other. (Prior to uniting the strips the specially formed strip may be heated to partially cure the plastic material included in it.) While the strips are in intimate contact, they are moved forward to a position such that they are engaged by a heat-applying, plastic-curing device. The cured strips are then cut into desired lengths to form separate panels.

Each of the three units disclosed receives a continuous strip of interwoven fibrous material, impregnates the same with a liquid plastic material, compresses the impregnated strip to remove excess plastic material therefrom and to accomplish a substantially uniform dissemination of the material throughout the extent of the fibrous strip. One of the impregnated strips is then specially formed by means of corrugating rolls, and is finally delivered between two previously impregnated strips so that the three strips are held in registering contact during the movement of the three strips so that successive portions thereof may be acted on by a curing device which subjects each of the three combined strips to a curing temperature while the central or corrugated strip is retained in corrugated form by means of forming pins or mandrels inserted into apertures formed by the corrugations of the central strip. After the curing operation the finished strip is, as noted, severed into sections of desired length. By registering contact of the strip I mean that the strips are superimposed one on the other with their lateral edge extending parallel to each other and in effect in contact.

Referring to Fig. 1, the apparatus there illustrated includes units A, B, and C. As illustrated, each unit receives a strip of interwoven fibrous material 16 from a separate receptacle 17 which is located above a pair of pressure-applying and impelling rolls 18. The strip engaged by each pair of such rolls is delivered downwardly between spaced receptacles 19 each of which is provided with a partially submerged orifice 20 formed in one side thereof. The receptacles 19 are adjustably mounted on a support so that they are movable toward and away from each other to accommodate the passage between them of strips of different thickness. Each orifice 20 is located in one side wall of one of the receptacles 19, which wall is so formed that the lower bounding edge of the orifice is capable of being moved into contact with the strip material passing between the two receptacles 19. In this way liquid plastic material overflowing the lower edge of each orifice 20 is delivered to and enters the strip of material passing between the two receptacles. As noted in the now preferred embodiment, each strip 16 is periodically moved so that it is advanced in a step by step movement. It, however, will be apparent that during the impregnation portion of the procedure each strip may move continuously.

Figure 5:
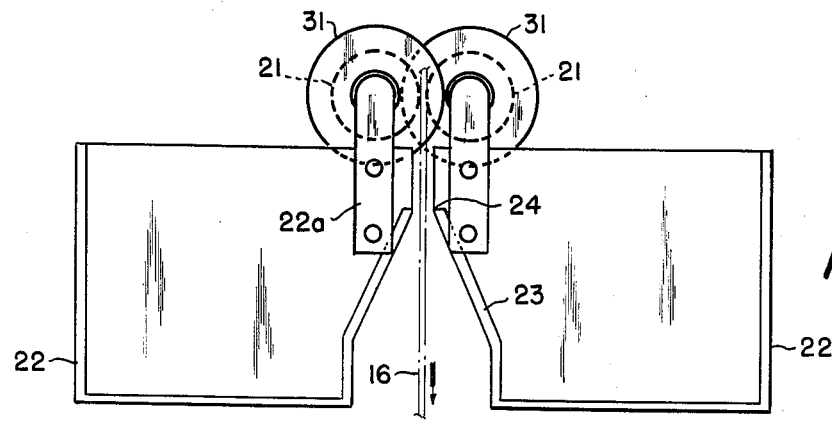
Fig. 5 is an end view of stripper tank equipped with apparatus for compressing strip material after the application thereto of plastic material and for forcing excess plastic material from the strip material.
Figure 6:
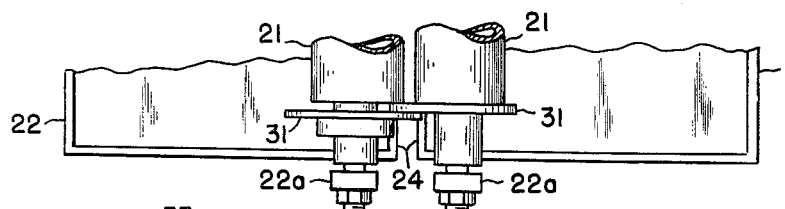
Fig. 6 is a fragmental plan view of the apparatus shown in Figure 5.
Figure 7:
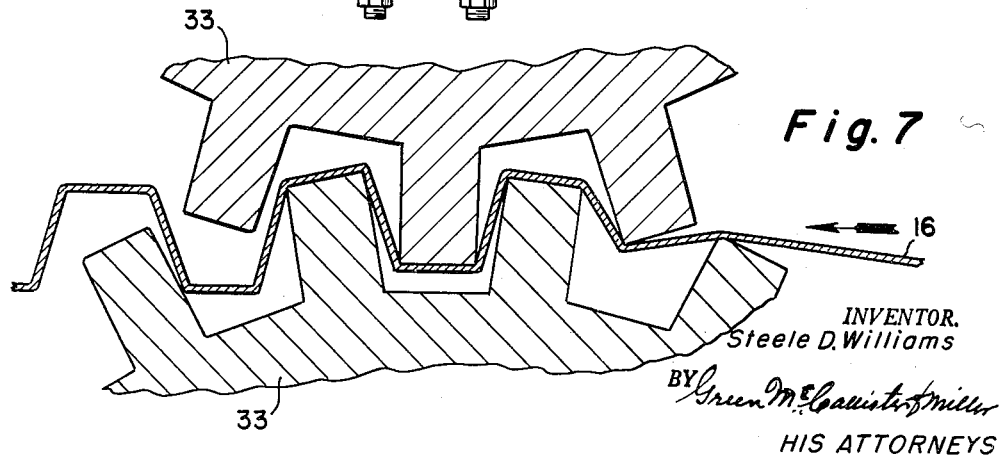
Fig. 7 is a fragmental transverse view of intermeshing gears employed in corrugating a strip of plastic impregnated fibrous material which is included in the make-up of the finished product.

In the illustrated embodiment of the invention, each liquid-impregnated strip, after passing between the two orifices 20 of tanks 19, continues its downward movement and is engaged by pressure-applying rolls 21 which are located immediately above and, as shown in Figures 5 and 6, are mounted on the end walls of a receptacle 22. The rolls 21, like the rolls 18, are preferably periodically rotated and are adjustable laterally toward and away from each other so as to apply pressure to the strip 16 passing between them, and to so apply sufficient pressure that excess plastic material is forced out of the strip and the plastic material remaining in the strip is uniformly distributed throughout the entire width of the strip.

In order to accomplish this and to also salvage the plastic material squeezed from the strip, each receptacle 22 is specially formed so that the bottom portion thereof is provided with an upwardly projecting, transversely extending nose 23 which terminates in an aperture or passage 24 located adjacent the upper edge of the receptacle 22 and of sufficient width and length to accommodate the passage of the downwardly moving strip 16. The aperture 24 is preferably located immediately below the passage between the receptacle 19. After the strip 16 has passed through the aperture 24, it is engaged by a pair of pressure-applying, strip-impelling rolls 25. As shown in Figure 1, two sets of such pressure-applying, impelling rolls are included as a part of each unit. The second set is designated by the numeral 25a in both the units A and B and one roll of a functionally corresponding set in the unit C is designated by the reference character 25c. In addition to applying pressure and impelling force to the impregnated strip 16, one of each of the above mentioned secondary rolls functions to change the direction of movement of the strip engaged by it. To the extent described, the three units A, B, and C are substantially identical.

Figure 4:
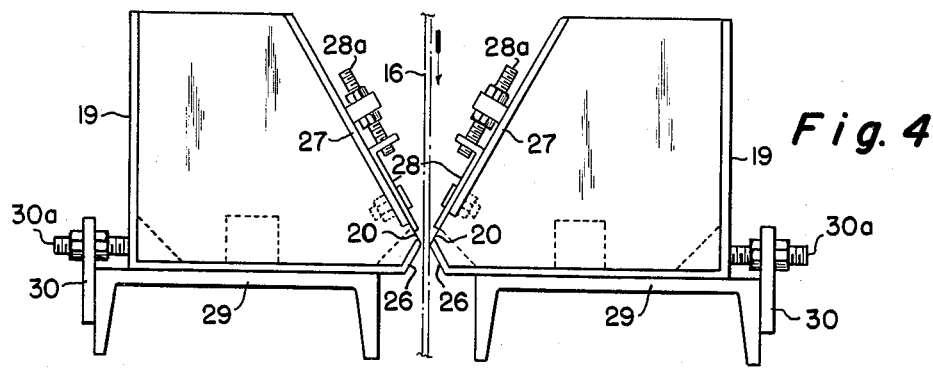
Fig. 4 is an end view of a coating tank forming a part of the apparatus illustrated in Figure 1.

The impregnating tanks 19 included in each of the units A, B, and C are illustrated more or less in detail in Fig. 4. As there shown, each tank is provided with bottom and a rear wall which extend at right angles to each other. Each tank is also provided with two end walls which extend at right angles to the bottom and rear walls. The front wall of each tank is, however, specially formed to provide for the proper positioning of the orifice 20 formed therein. The orifice extends lengthwise of the tank or transversely of the adjacent strip 16, and is shown located between wall portions 26 and 27 which extend at an obtuse angle to each other with the upper edge of the wall portion 26 spaced from the lower edge of the wall portion 27. The two portions 26 and 27 are so located relatively to the bottom portion of each tank that the orifice 20 is located a short distance above and to one side of the bottom of the tank. Each plastic delivering orifice 20 is located between the upper lip of the wall portion 26 and an adjustable gate 28, secured to the wall portion 27. Each gate 28 is provided adjacent one end thereof with an adjusting bolt 28a which is supported by a bracket secured to the wall portion 27 and extends through a threaded aperture formed in an upturned lip at the upper edge of the gate 28. Lock nuts are provided for each bolt 28a for securing it in an adjusted position.

As shown, each tank 19 is mounted on a separate support 29. Each support is illustrated in the form of a channel section and may form a part of a frame structure such as diagrammatically illustrated in Figure 1 for supporting apparatus forming a part of the units there illustrated. The two channel sections 29 on which the cooperating tanks 19 are located, are spaced from each other and each tank 19 is so supported thereon that the portion of the bottom of the tank adjacent the part 26 overhangs the lateral edge of the section 29 on which the tank is supported. In addition, each tank 19 is so located on its support section 29 that it is adjustable toward and away from the companion tank 19. Any suitable means may be employed for adjusting and holding the two cooperating tanks in the desired relative positions but, as shown in Figure 4, an upstanding lug 30 is provided on the edge of each support section 29 which is remote from the companion support section. Each lug 30 is provided with a tapped aperture through which an adjusting bolt or screw 30a extends. Each screw is shown as threaded through the aperture of the lug and is provided on opposite sides of the lug with lock nuts for securing it in an adjusted position. Two such lugs and screws are preferably provided for each tank 19.

It will be apparent from the prior description that companion tanks 19 are so positioned on their supports that the lower lip of the orifice 20 formed in each tank, engages one face of the strip 16 of fiber glass, located between the two companion tanks 19. From the foregoing it will also be apparent that the flow through each orifice 20 may be controlled by positioning the gate 28 relatively to the upper edge or lip of the wall portion 26 and in this way the flow of liquid plastic material from each tank 19 and to the strip 16 passing between the tanks, may be effectively controlled.

As shown in Fig. 1, a stripper tank 22 is located immediately below each pair of impregnating tanks 19. As previously described, the bottom of the tank 22 is so formed as to provide an upwardly extending nose 23 which terminates in an aperture 24. The aperture extends throughout the length of the tank and provides a passageway for a strip 16 after it has passed between a pair of companion tanks 19. As shown in Figures 5 and 6, the pressure rolls 21 are journaled in supports 22a, each of which is mounted on an end wall of the tank and is located adjacent the aperture 24. That is to say, one support 22a is located on one side of the aperture 24 and the other support is located on the other side of the aperture. Each end of each roll 21 is provided with a deflecting plate 31 which abuts the end of the roll. The two plates at each end of the rolls 21, in effect, interleave with each other and are located within the confines of the tank near the adjacent end wall.

With this arrangement, excess liquid removed from the strip 16 by the cooperation of the rolls 21 will collect in the tank 22 and, as shown in Figure 1, each tank 22 may be equipped with two pumps 32 each arranged to withdraw liquid from the tank 22 and deliver it to one or the other of the companion tanks 19 located immediately above the tank 22. The operation of the pumps 32 may be controlled by a float located within the tank 22 or each pump may be controlled by a float located within the tank 19 to which the pump delivers liquid. The float control thus described is for the purpose of maintaining an approximately constant head of liquid above the lower lip of each orifice 20 of each tank 19, it being understood that each pump 32 is motivated by a separate motor preferably an electric motor.

Referring again to Figure 1, it will be noted that the strip 16 which is acted upon by the unit B is turned at a right angle as it passes through the pressure rolls 25a of unit B. Thus the strip leaving the rolls 25a moves horizontally toward a pair of corrugating rolls 33. It will also be apparent that the strip issuing from the rolls 25a of unit A also turned at a right angle moves horizontally belows the rolls 25a of unit B and also below the corrugating rolls 33. The strip 16 of unit A is delivered to and passes through a third set of contact rolls 25d and in passing through these rolls is turned again at a right angle and extends substantially vertically as it issues from the rolls 25d and is engaged by a roll 25e which is located in opposed spaced relationship to the roll 25c of the unit C.

Reference to Figure 1 also makes it apparent that the strip 16 which is corrugated by the rolls 33, moves horizontally to and between the rolls 25c and 25e where it is engaged by the plastic-impregnated strips 16 previously acted on by the units A and C.

After successive portions of the strip 16 leaving the unit B have been acted upon by the corrugating rolls 33, they are preferably acted upon by the two dies of a contact press 34. The press 34 besides periodically confining successive portions of the corrugated strip, holds that strip in the corrugated form while delivering a curing heat to it. The heat is preferably so applied that the corrugated strip is only partially cured as successive portions thereof leave the contact press. With this arrangement the partially cured corrugated strip is contacted by the impregnated and uncured strips leaving the units A and C.

As previously described the rolls 25c and 25e are so positioned as to move the three strips into contact with each other so that the corrugated strip is sandwiched between two plain or flat strips. The rolls 25c and 25e not only press the three strips into contact, but also cooperate in simultaneously propelling the three strips horizontally. This propelling action is supplemented by a pair of rolls 35 which are so located relatively to each other that they engage the the flat faces of the combined strip leaving the rolls 25c and 25e. A reference to Figure 1 discloses that the combined strip in passing from the rolls 25a and 25e to the pair of rolls 35, passes between two dielectric plates 36 which are positioned to cooperate with forming pins or mandrels which, in the present embodiment, are terminals of a dielectric apparatus and cooperate with the plates 36 in delivering curing heat to the combined strip, as hereinafter described.

Figure 8:
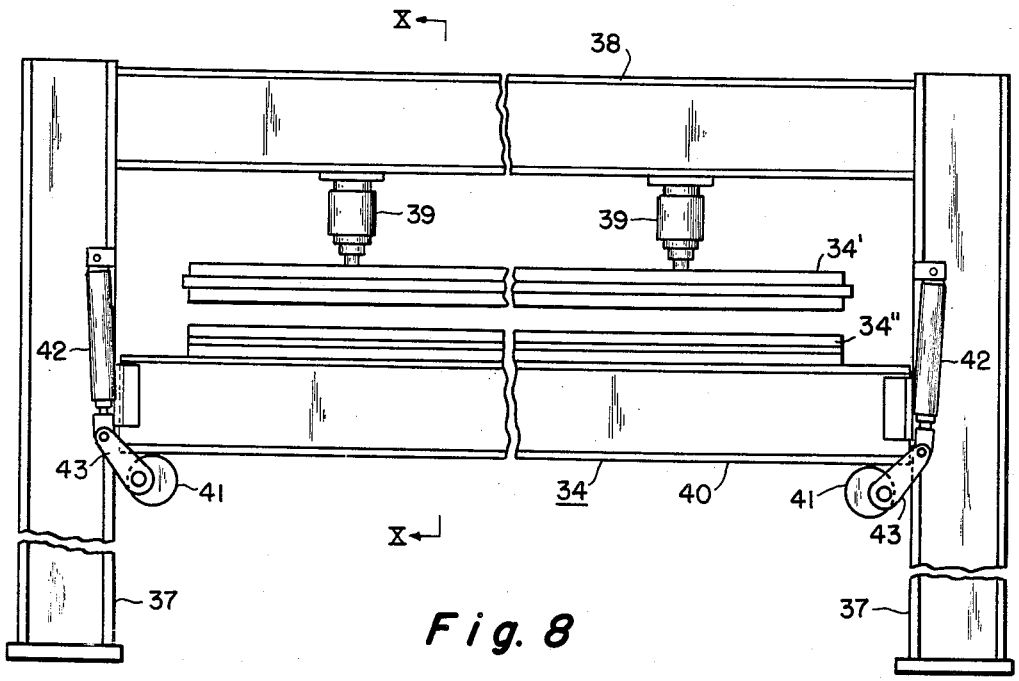
Fig. 8 is a fragmental side elevation of a panel press forming a part of the apparatus employed in producing panel strip material embodying my invention, the press being shown in the open or inoperative position.
Figure 9:
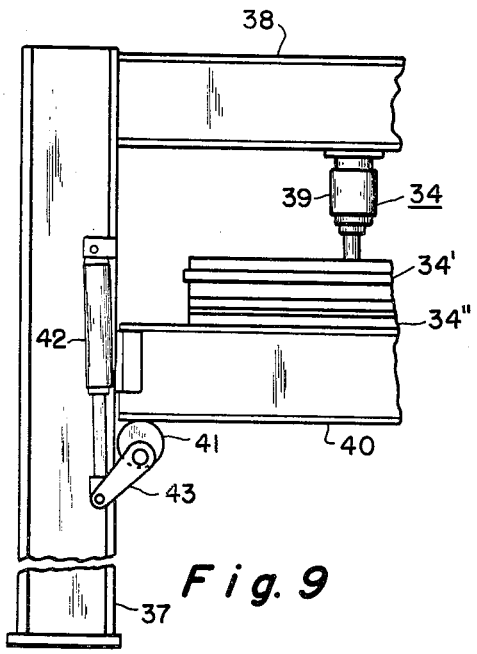
Fig. 9 is a fragmental side elevation showing the press in the closed or in the pressure-applying position.
Figure 10:
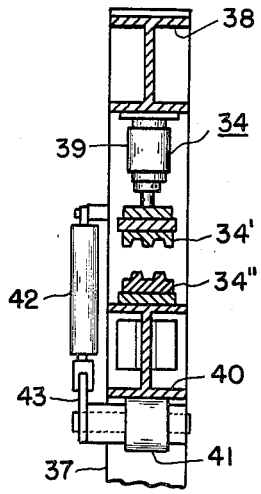
Fig. 10 is a sectional view of the press showing the dies thereof in the open position.

The contact press 34 shown in Figure 1, is more fully illustrated in Figures 8, 9, and 10 of the drawings. The press is provided with two dies 34' and 34", each movable to positions toward and away from the other die. As illustrated, the opposing dies are so formed that they cooperate in completing the formation of the corrugations in the strip material acted upon by the corrugating gears 33. Each die is of sufficient length that its ends overlap the edges of the widest corrugated strip delivered to it. As shown in Figures 8, 9, and 10 the separate dies are mounted on a frame portion which includes vertical support members 37 and a horizontal support member 38. The uppermost die 34' is supported on the member 38 by means of a cylinder and piston combination 39 spaced along that member and also along the die 34'. The piston of each cylinder is provided with a piston rod which is rigidly secured to the rear or inactive face of the die 34'. The opposed cooperating die 34" is shown mounted on a cam-actuated I-beam 40, the ends of which are located in vertically extending guideways formed on the vertical support members 37. As shown in Figures 8, 9, and 10, the beam 40 is actuated by a pair of cams 41 suitably supported on the vertical supports 37. Each cam is operated by piston and cylinder combinations 42 through the agency of a crank arm 43. The piston-cylinder combination is of the commercial type known as the Ortman Miller Hydraulic Cylinder. Each such combination is supported by a vertical member 37, and the cam 42 actuated thereby may be suitably mounted on the same support member.

As indicated by Figure 10, each of the two cams 41 that engage and support the beam 40 is suitably mounted on a separate support member 37 and the arrangement is such that as the cams are turned from the position shown in Figure 8 to the position shown in Figure 9, the die member 34" is raised to a position such that it cooperates with the die member 34' in engaging the previously corrugated strip 16. It will be apparent that both the cams 41 are simultaneously actuated by the piston-cylinder combinations 42 as the upper die member 34' is actuated. As previously noted, each of the die members 34'—34" may constitute a terminal of a dielectric machine and as such impart heat to the corrugated strip engaged by them. However, it is desirable to so control the heat as to only partially cure the corrugated strip.

Figure 13:
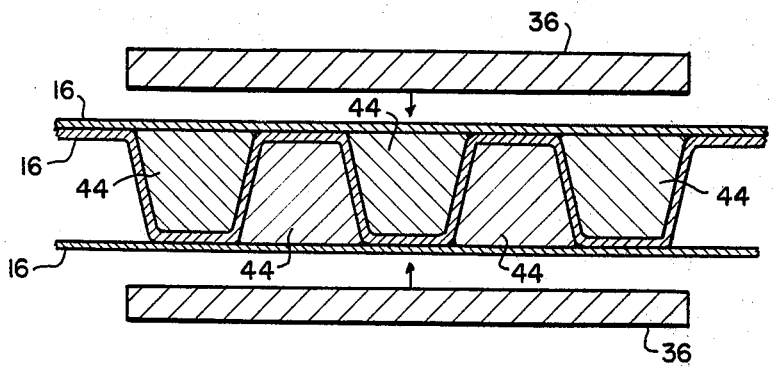
Fig. 13 is a sectional view of a portion of the formed strip showing the position of the mandrels within the strip during a strip-curing operation.

In Figure 13 I have diagrammatically illustrated the dielectric plates 36 located above and below the combined strip formed by the action of the rolls 25c and 25e. As there indicated, the combined strip is held stationary and forming mandrels 44 are introduced into the spaces between the strips formed by the corrugations of the central strip. It should, however, be understood that as the mandrels are moved into engagement with the strip the plates 36 are also in engagement with the strip.

Figure 14:
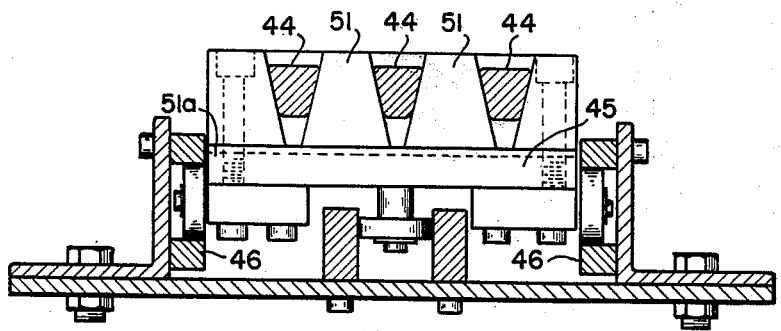
Fig. 14 is a sectional view along the line XIV—XIV of Figure 11.
Figure 15:
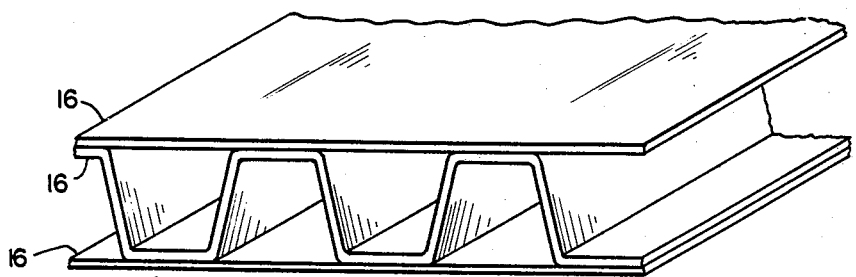
Fig. 15 is a fragmental view of the finished panel strip constituting one aspect of the invention here illustrated.

Figs. 11, 12, and 14 disclose the operating mechanism for the mandrels 44. Figs. 11, 11a, 12 and 12a also indicate that the mandrels 44 are divided into two groups, one of which includes three mandrels and the other includes two mandrels. The mandrels of each group are secured to and actuated by a separate roller supported table 45 which is moved back and forth along rails 46 by means of a rack and pinion mechanism consisting of a rack 47 and a pinion 48. The rack is actuated by a reciprocating plunger which is, in fact, a piston rod 49′ forming a part of a cylinder and piston combination 49. Each set of rails 46 form a part of a support frame for one of the tables 45 and the associated mandrels 44. Each mandrel is suitably secured to its supporting table 45 by means of a strip of insulating material 50 such as micarta. The forward end of each mandrel is located in and supported in a V-shaped groove formed between projections or tongues 51 formed on a piece of insulating material. The tongues 51 constitute guides for the mandrels 44 and are disclosed in Figures 11, 12, and 14. They are formed of insulating material such as micarta. As shown, the tongues 51 are secured to a support element 51a which may also be formed of insulating material.

The pinion 48 is mounted on a shaft 52 which is suitably journaled in bearings carried by support frame for the table 45. A sprocket 53 is also mounted on the shaft 52. The sprocket 53 and a cooperating sprocket wheel 54 support a chain 55, the opposite ends of which are secured to the forward and rear ends of the mandrel supporting table 45. With such an arrangement, each table 45 is moved back and forth by reciprocations of the associated rack 47 so that the mandrels supported by each table 45 are advanced as the rack moves in one direction and are retracted as the rack moves in the opposite direction. It will be understood that each group of mandrels is provided with similar operating mechanisms and that the two groups are so actuated that the mandrels of each group simultaneously advance and are also simultaneously retracted. During the advance movement of the mandrels, the two groups move toward each other and into the opposite ends of separate spaces formed by the corrugations of the central strip 16 and located between that strip and the flat strips secured to it. As noted, each group of mandrels constitute terminals of a dielectric apparatus (not shown) so that the plates 36 and the mandrels cooperate in delivering curing heat to the plastic material impregnating the strips going into the make-up of the combined strip which is located between the two plates 36, Figures 1 and 13.

The operating mechanisms of the two tables 45 are synchronized with each other and so synchronized with the operating mechanisms of the combined strip and the strips 16 included in the make-up of the combined strip, that the mandrels 44 are introduced into and withdrawn from the combined strip as that strip is held stationary.

A reference to Figure 1 of the drawings will also make it apparent that the plates 36 move into and out of engagement with the combined strip while the strip is stationary. Figure 1 also discloses that the upper plate 36 is actuated by a piston-cylinder combination 60, so that it is moved downwardly into contact with the combined strip while the opposed plate 36 is moved upwardly into contact with the strip. The lower plate is shown as actuated by a cam 41a similar to one of the cams 41 disclosed as the operating mechanism for the die 34″ of the contact press.

After the plates 36 are moved out of contact with the combined strip and the mandrels 44 are withdrawn from the spaces included in that strip, the strip is moved forward by the action of the various such rolls including the rolls 35, and is delivered to the severing device 57. The extent of each forward movement of the strip will depend upon the form and functioning of apparatus employed in connection with the processing of the strip, e.g., in the illustrated embodiment, the extent of such motion will depend upon the width of the contact press 34 and the number of mandrels 44 employed in the processing of the combined strip. It will be apparent that the contact press 34 may be of such width that it will engage more than five of the corrugations formed by the corrugating gears 33 and that under such circumstances each forward movement of the strip will be gauged so that each corrugation formed in the central strip by the gears 33 is engaged by, but only once by, the contact press 34. Likewise, the number of mandrels employed in the two groups as illustrated in Figures 11 and 12, will be varied to correspond to the number of corrugations engaged by the contact press 34.

Any suitable means may be employed for advancing the separate strips 16 which go into the make-up of the final or combined strip. However, in Figure 2 I have diagrammatically illustrated the rollers 18, 25, and 25a of each of the units A and B, actuated by means of a separate sprocket chain and cooperating sprocket wheels. The sprocket chain included as a part of the unit A is designated by the numeral 58. The corresponding apparatus of the unit B is shown as driven by a chain 59. The driving chain of the unit C is designated by the numeral 61 and it is noted that the operating mechanism of the unit C does not drive the rolls 25c and 25e. As shown in Figure 2, these rolls are driven by a separate sprocket chain 62, which also drives the rolls 25d and the rolls 35.

Each of the chains 58, 59, 61, and 62 is separately driven by apparatus diagrammatically illustrated in Figure 2 and which includes as a part thereof a hydraulic cylinder 63 of the type of the commercial Ortman Miller hydraulic cylinder, an overrunning clutch mechanism such as the Morse roller clutch and a sprocket wheel 64. The roller clutch mechanism is a well known commercial type and is only illustrated diagrammatically in Fig. 3 and is there designated by the numeral 66. It intervenes between the associated sprocket wheel 64 and the operating hydraulic cylinder 63 and is, in effect, an overrunning clutch device which actuates the sprocket wheel during one stroke of the piston, operating in connection with the corresponding hydraulic cylinder 63, and overruns during the return stroke of the piston. That is to say, the overrunning device of the Morse clutch is such that during one stroke of the piston, included in each hydraulic cylinder 63, the associated sprocket wheel 64 is rotated in one direction, as illustrated in Figure 2, and then during the return piston stroke the sprocket remains stationary. Thus each of the chains 58, 59, and 61 drives the propelling rolls so as to move the fibrous strips 16 forward in a step by step movement. This also defines the operation of the chain 62 in connection with the rolls 25c, 25d and 25e and the pair of rolls 35.

A further reference to Figure 2 discloses that the corrugating gears 33 are also driven by a hydraulic cylinder mechanism 63 such as the Ortman Miller hydraulic cylinder, through the agency of a Morse roller clutch 66 which, as previously noted, operates as an overrunning device while the piston of the cylinder is moving in the reverse direction.

The sprocket wheel 64 included as a part of the unit B, is of greater diameter than either of the corresponding wheels of units A and C. This is occasioned by the fact that the corrugating of the fiber strip 16 issuing from the unit B has the effect of reducing the length of that strip. Thus in order that the effective lengths of the three strips, which are united to form the combining strip by the operation of the rolls 25c and 25e, will correspond to each other, the central strip 16 moving toward the corrugating rolls 33, is moved synchronously with, but at a greater distance than the other strips during each step by step movement. After the central strip is corrugated its length movements are the same as those of the other two strips and it necessarily moves in unison with the two strips combined with it.

In order to synchronize the operation of all the apparatus employed in the practice of my invention, I employ a timer such as the National Dial Set Timers manufactured and distributed by National Time and Signal Corporation. Thus the operation of all the hydraulic cylinders 63 is controlled by such a timer. In addition, the hydraulic cylinders 42 which actuate the cams 41 and 41a and also the cylinder-piston combinations 39 and 60 (Figure 8) are all controlled by the above mentioned timer. The operation of the cylinder and piston combination 42 (Figure 9) is also controlled by the timer so that the mandrels 44 are moved into and out of engagement with the combined strip as that strip is held stationary. The same timer preferably controls the operation of the dielectric apparatus (not shown) in the delivery of heating current to the dies 34' and 34'' of the contact press, to the plates 36 and the mandrels 44. The structural and functional features of the timer are so well known by machine designers that its illustration seems unnecessary. It will, of course, be apparent that the severing mechanism 57 may also be controlled by the timer. As indicated in Figure 1, the mechanism includes a rotating saw driven by an electric motor and it will be apparent that the saw will move into and out of the cutting position during the period of rest of the combined strip leaving the pair of rolls 35.

While I have illustrated the fiber strips 16 delivered to each of the units A, B, and C as issuing from stationary receptacles 17, it will be apparent that each such strip may be in the form of a coil mounted on a spool so that it is fed from the spool by the pull of the cooperating pressure and propelling rolls 18 which engages it.

It will also be apparent that other changes may be made in the apparatus and also in connection with the procedure here disclosed without departing from the spirit and scope of the invention as defined by the appended claims.

What I claim is:

1. A method of continuously forming panel structures which consists in moving each of two strips of fiber mat longitudinally of itself; separately applying plastic material in liquid form to each side of each of such strips during the movement thereof; corrugating one of such strips; interrupting the movement of both strips and partially curing the plastic material of the corrugated strip while applying corrugating pressure to the newly formed corrugations thereof; then continuing the movement of both such strips and moving the strips into contact with each other with the uncorrugated strip lying flat against tips of corrugations of the corrugated strip; pressing the two strips into intimate contact with each other while applying a curing heat to the strips; and then continuing the movement of the combined strips; and finally severing the combined strips into separate lengths.

2. A method of continuously forming panel structures which consists in separately moving each of two strips of fibrous material longitudinally of itself; separately subjecting each side of each such strip to a flow of plastic material in liquid form; corrugating one such strip during the simultaneous movement of both such strips; interrupting the movement of both strips and applying the dies of a corrugating press to the newly corrugated portion of the corrugated strip and simultaneously partially curing the plastic material of the engaged portion of the corrugated strip; then again moving each such strip longitudinally of itself and into contact with the other such strip; interrupting such movement and simultaneously subjecting the combined strips to pressure and to a curing heat; and then continuing the movement of the combined strip; and finally severing the same into separate lengths.

3. A method of forming panel structures which consists in moving each of three separate strips of fiber mat material longitudinally of itself; applying plastic material in liquid form to each of the three strips during such movement; corrugating one such strip while continuing the movement of the three strips; interrupting such movement and subjecting the corrugated strip to the action of corrugating dies while partially curing the plastic material of the engaged portion of such strip by the application of heat thereto; then continuing the movement of the three strips while moving the strips into contact with each other with the corrugated strip located between the other two strips and with each uncorrugated strip engaging and lying flat against the tips of the corrugated strip, interrupting the movement of the three strips and pressing the strips into intimate contact with each other while applying a curing heat to the plastic material of each of said strips; then severing the combined strip into separate lengths.

4. Apparatus for forming a composite strip which consists of means for separately moving each of three strips of fiber mat material longitudinally of itself; means for applying plastic material in liquid form to each such strip during the movement thereof; means for corrugating one such strip; means for moving the three strips into registering contact with the corrugated strip located between the two uncorrugated strips; two sets of mandrels, each movable from opposite sides of the combined strip into and out of apertures in the combined strip formed by the corrugations of the central strip; means for moving each such set of mandrels into and out of contact with the combined strip; and means for applying curing heat to the combined strips while said mandrels of both said sets are in contact with the combined strip.

5. Apparatus for forming a composite strip which consists of means for separately moving each of three strips of fiber mat material longitudinally of itself; means for applying plastic material in liquid form to each such strip during the movement thereof; means for corrugating one such strip; means for separately applying a curing heat to the newly corrugated portion of the corrugated strip; means for moving the three strips into registering contact with the corrugated strip located between the two uncorrugated strips; two sets of mandrels, each movable from opposite sides of the combined strip into and out of apertures in the combined strip formed by the corrugations of the central strip; means for moving each such set of mandrels into and out of contact with the combined strip; and means for applying curing heat to the combined strips while said mandrels of both said sets are in contact with the combined strip.

6. A method of forming panel structures which consists in moving each of three separate strips of fiber mat material longitudinally of itself; applying plastic material in liquid form to each of the three strips during such movement; corrugating one such strip while continuing the movement of the three strips; interrupting such movement and subjecting the corrugated strip to the action of corrugating dies while partially curing the plastic material of the engaged portion of such strip by the application of heat thereto; then continuing the movement of the three strips while moving the strips into contact with each other with the corrugated strip located between the other two strips and with each uncorrugated strip engaging and lying flat against tips of the corrugated strip; interrupting the movement of the three strips and introducing mandrels into the combined strip from opposite sides thereof then pressing the strips into intimate contact with each other while applying a curing heat to the plastic material of each of said strips; then withdrawing the mandrels from the combined strip and severing the combined strip into separate lengths.

7. A method of forming a paneled structure which comprises, moving at least two strips of fiber mat material longitudinally of themselves; separately impregnating each such strip with plastic material in liquid form during such motion; corrugating one such strip during the movement thereof and subjecting the plastic material permeating the corrugated strip to a curing heat while mechanically maintaining it in corrugated form; then moving the strips into contact with each other, with the uncorrugated strip lying along one side of the corrugated strip and in engagement with the tips of the corrugations of such strip; interrupting the longitudinal movement of the contacting strips and introducing mandrels endwise into the apertures formed by corrugations of the corrugated strip; pressing the uncorrugated strip into intimate contact with the tips of the corrugated strip located along one side of such strip while the mandrels are in place and simultaneously applying a curing heat to the plastic material impregnating both of said contacting strips; then withdrawing the mandrels from the combined strip and then continuing the longitudinal movement of such strips and severing the combined strips into panel lengths.

8. A method of forming a paneled structure which comprises, moving each of two strips of fiber mat material longitudinally of itself; separately impregnating each such strip with plastic material; corrugating one such strip during the continued movement thereof; then subjecting the corrugated strip to a curing heat for the resin material impregnating same; moving the strips into contact with each other with the uncorrugated strip lying along one side of the corrugated strip in engagement with the tips of the corrugations of that strip located along the engaged side thereof; interrupting the longitudinal movement of the thus engaged strips and introducing mandrels endwise into the apertures formed by corrugations of the corrugated strip and applying a curing heat to the plastic material impregnating both such strips while the mandrels are in engagement with the engaged strips; and then withdrawing the mandrels from the combined strip and severing the combined strips into panel lengths.

9. Apparatus for producing a paneled structure which includes two units each including means for propelling a separate strip of fiber mat material longitudinally of itself and means for impregnating the impelled strip with plastic material in liquid form during the movement thereof; means included in but one such unit for corrugating one impregnated strip during the longitudinal movement thereof; means included in the other such unit for applying corrugating pressure to the corrugated strip while subjecting such strip to a curing heat for the plastic material contained therein; means for moving the two strips into contact with each other, with the uncorrugated strip engaging tips of the corrugations along one side of the corrugated strip and means for introducing mandrels endwise into the apertures included in the contacting and combined strips and formed by corrugations of the corrugated strip; means for applying pressure to the combined strip while the mandrels are in place therein; means for withdrawing the mandrels from the combined strip and means for severing the combined strips into panel lengths.

10. A method of forming panel structures which comprises, moving each of two strips of fiber mat material longitudinally of itself; separately impregnating each such strip with plastic material during the movement thereof; corrugating one such strip during the continued longitudinal movement thereof; subjecting the corrugated strip to a curing heat for the plastic material contained therein while mechanically maintaining such strip in corrugated form; moving the two strips into contact with each other, with the uncorrugated strip lying along one side of the corrugated strip and engaging tips of the corrugations thereof; interrupting the longitudinal movement of the strips and introducing mandrels endwise into spaces between the corrugated strip and the uncorrugated strip formed by corrugations of the corrugated strip and pressing the strips into intimate contact with each other while the mandrels are in place in the combined strips and simultaneously applying a curing heat to plastic material impregnating the strips; then withdrawing the mandrels from the combined strips, continuing the longitudinal motion of the combined strips and severing the same into panel lengths.

References Cited in the file of this patent

UNITED STATES PATENTS

| | | |
|---|---|---|
| 1,519,281 | Wandel | Dec. 16, 1924 |
| 1,591,062 | Smith | July 6, 1926 |
| 1,975,548 | Ives | Oct. 2, 1934 |
| 2,047,584 | Harrap | July 14, 1936 |
| 2,300,760 | Amigo | Nov. 3, 1942 |
| 2,423,870 | Blessing | July 15, 1947 |
| 2,494,642 | Case et al. | Jan. 17, 1950 |
| 2,523,524 | Sachs | Sept. 26, 1950 |
| 2,526,945 | Gray | Oct. 24, 1950 |
| 2,547,880 | Meyer | Apr. 3, 1951 |
| 2,606,133 | Havens | Aug. 5, 1952 |
| 2,609,315 | Engel et al. | Sept. 2, 1952 |
| 2,719,566 | Blatt | Oct. 4, 1955 |
| 2,737,227 | Brummel | Mar. 6, 1956 |
| 2,779,388 | Quoss | Jan. 29, 1957 |

FOREIGN PATENTS

| | | |
|---|---|---|
| 1,077,254 | France | Apr. 28, 1954 |
| 1,087,950 | France | Sept. 1, 1954 |